(12) United States Patent
Hassan et al.

(10) Patent No.: US 9,954,320 B1
(45) Date of Patent: Apr. 24, 2018

(54) CABLE CONNECTOR

(71) Applicant: Ford Global Technologies, LLC, Dearborn, MI (US)

(72) Inventors: Zubair Hassan, Canton, MI (US); Hagop Parnoutsoukian, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/413,276

(22) Filed: Jan. 23, 2017

(51) Int. Cl.
| | | |
|---|---|---|
| *H01R 13/6593* | (2011.01) | |
| *H01R 4/20* | (2006.01) | |
| *H02G 15/115* | (2006.01) | |
| *H01R 4/02* | (2006.01) | |
| *H01B 7/18* | (2006.01) | |

(52) U.S. Cl.
CPC ....... *H01R 13/6593* (2013.01); *H01B 7/1875* (2013.01); *H01R 4/023* (2013.01); *H01R 4/20* (2013.01); *H02G 15/115* (2013.01)

(58) Field of Classification Search
CPC ...... H01R 13/6593; H01R 4/023; H01R 4/20; H01B 7/1875; H02G 15/115
USPC .... 174/359, 73.1, 74 R, 84 R; 439/578, 394, 439/607, 608, 609, 610
See application file for complete search history.

(56) References Cited

U.S. PATENT DOCUMENTS

| | | | |
|---|---|---|---|
| 3,354,419 A | 11/1967 | Miller | |
| 3,585,568 A | 6/1971 | Hervig et al. | |
| 4,424,410 A * | 1/1984 | Edgerton | H02G 15/103 174/73.1 |
| 5,205,761 A * | 4/1993 | Nilsson | H01R 4/2462 439/394 |
| 5,821,459 A * | 10/1998 | Cheenne-Astorino | H02G 15/103 174/73.1 |
| 6,809,265 B1 * | 10/2004 | Gladd | H02G 15/085 174/74 R |
| 7,374,427 B2 | 5/2008 | Kodaira et al. | |
| 8,399,766 B2 * | 3/2013 | Hane | H01R 13/533 174/84 R |
| 2015/0357739 A1 | 12/2015 | Cherian et al. | |

FOREIGN PATENT DOCUMENTS

| | | |
|---|---|---|
| DE | 202009005412 U1 | 6/2009 |
| JP | 2008251456 A | 10/2008 |
| KR | 20060008564 A | 1/2006 |

* cited by examiner

*Primary Examiner* — Timothy Thompson
*Assistant Examiner* — Michael F McAllister
(74) *Attorney, Agent, or Firm* — James P. Muraff; Neal, Gerber & Eisenberg LLP

(57) ABSTRACT

A linked cable assembly includes: (1) a pair of stripped shielded cable assemblies, each including: (a) a stripped cable including: an inner conductive core, an inner insulator surrounding the core, an inner shield surrounding the inner insulator, a sheath surrounding the inner shield; (b) a ring compressed directly against the inner shield. (2) a connector assembly electrically linking the shielded cables and including: a conductive shield housing, an insulator disposed within the shield housing, a conductive busbar contacting the insulator, but not the shield housing.

12 Claims, 4 Drawing Sheets

US 9,954,320 B1

CABLE CONNECTOR

TECHNICAL FIELD

This application relates to a cable connector for connecting electrical cables, such as shielded electrical cables.

BACKGROUND

When installed, an electrical cable may include bends to navigate about various obstacles. For example, when installed in a vehicle, the electrical cable may have to bend around an engine. If the electrical cable has a large diameter, the bend may induce severe internal stresses, thus increasing the probability of the cable snapping.

SUMMARY

Disclosed is a linked cable assembly, which includes: (1) a pair of stripped shielded cable assemblies, each including: (a) a stripped cable including: an inner conductive core, an inner insulator surrounding the core, an inner shield surrounding the inner insulator, a sheath surrounding the inner shield; (b) a ring compressed directly against the inner shield. (2) a connector assembly electrically linking the shielded cables and including: a conductive shield housing, an insulator disposed within the shield housing, a conductive busbar contacting the insulator, but not the shield housing.

The present disclosure enables two shorter cables linked with a connector to replace a single long bended cable. An obstacle avoiding bend previously required in the single long cable is replaced by the connector. The connector preserves shielding of the inner cores of the two shorter cables.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
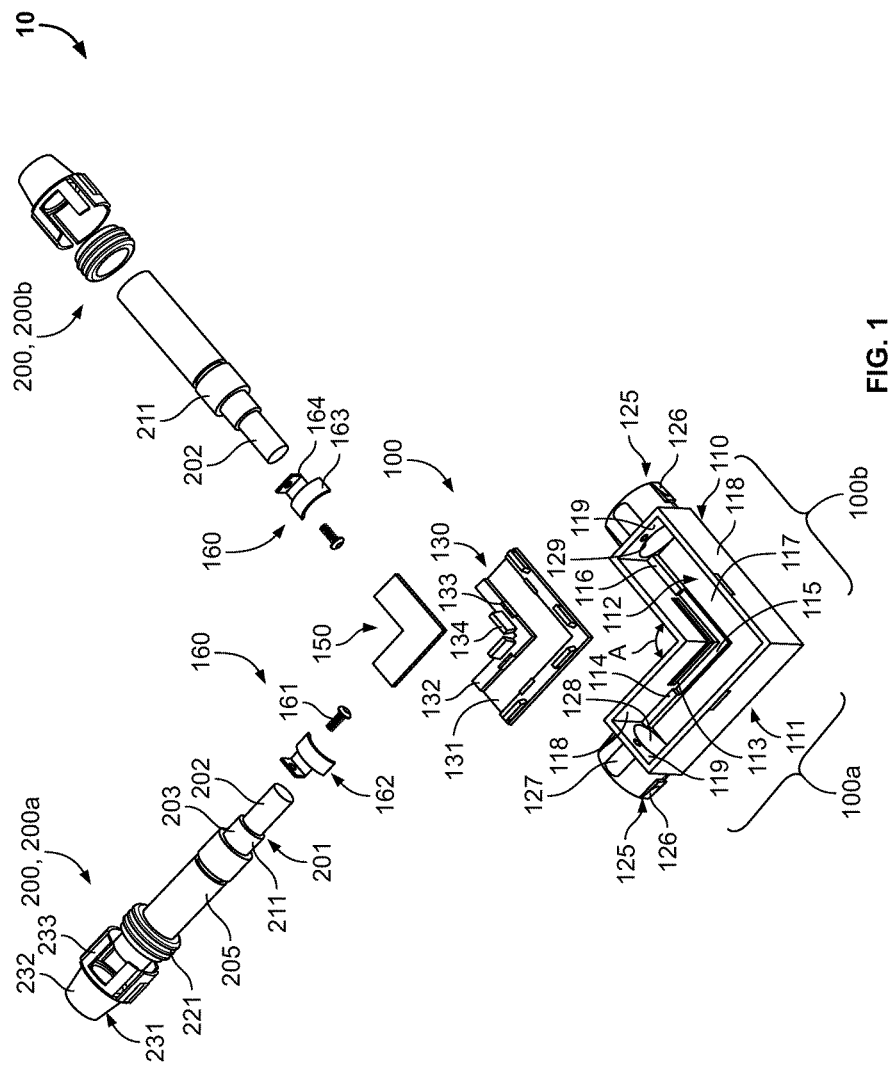
FIG. 1 is an exploded view of a linked cable assembly.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

Referring to FIG. 1, a linked cable assembly 10 includes a first cable assembly 200, 200a electrically joined with a second cable assembly 200, 200b via a connector assembly 100. First cable assembly 200a extends in a first direction. Second cable assembly 200b extends in a second direction. In FIG. 1, the first direction is perpendicular (90 degrees) with respect to the second direction, although such an orientation is purely exemplary. In practice, connector assembly 100 can be configured to accommodate any desired cable orientation (e.g., first and second cable assemblies being collinear, or extending in directions defined by any acute or obtuse angle). Furthermore, connector assembly 100 may be configured to accommodate unconventional connections. For example, connector assembly 100 may be "S" shaped or "U" shaped.

Connector assembly 100 includes a shield connector 110, an insulator 130, a bus bar 150, and spring clamp assemblies 160. Connector assembly 100 is configured to: (a) electrically join a first shield of first cable assembly 200a with a second cable shield of second cable assembly 200b via shield connector 110; (b) electrically join a first inner core of first cable assembly 200a with a second inner core of second cable assembly 200b via bus bar 150; and (c) mechanically join first cable assembly 200a with second cable assembly 200b via spring clamp assemblies 160 and via shield connector 110.

Connector assembly 100 includes a first portion 100a and a mirrored second portion 100b. First portion 100a meets mirrored second portion 100b at an angle A. As previously discussed, angle A may be any angle from 0 degrees to 360 degrees (inclusive). As previously discussed, connector assembly 100 may be shaped to accommodate unconventional geometries and thus may be "S" shaped or "U" shaped.

Shield connector 110 (also called shield housing 110) includes a body 111, ports 125, and a cover 170. Shield connector 110 is fabricated from an electrically conductive metal (e.g., copper). Body 111 defines a chamber 112, a pair of inner notches 113, and a plurality of outer notches 120. Body 111 includes a pair of first raised shelves 114, a pair of lower shelves 115, a pair of second raised shelves 116, a bottom wall 117, side walls 118, and end walls 119.

Figure 2:
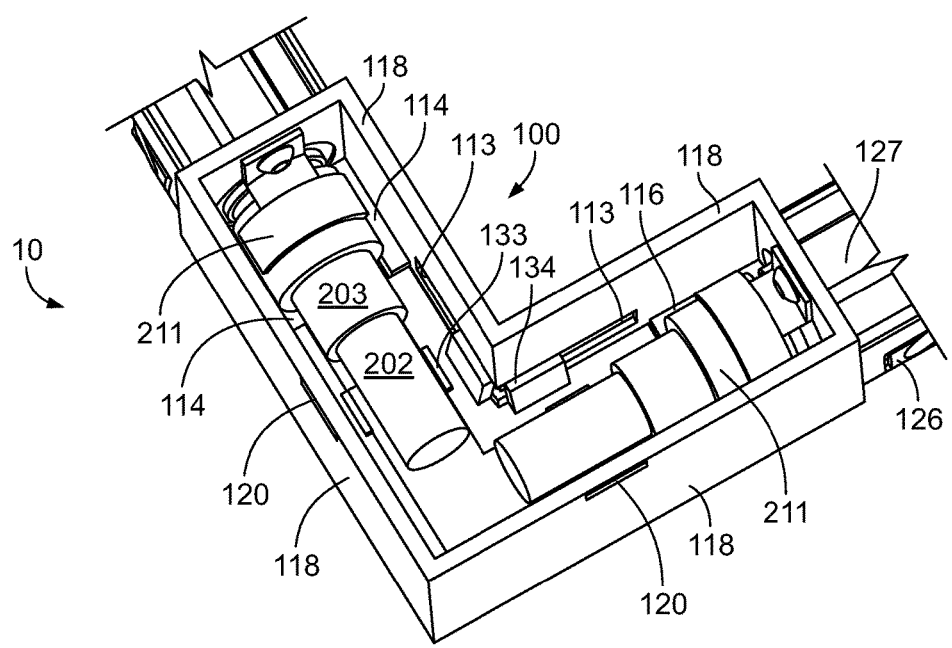
FIG. 2 is an enlarged partial isometric view of the linked cable assembly.
Figure 5:
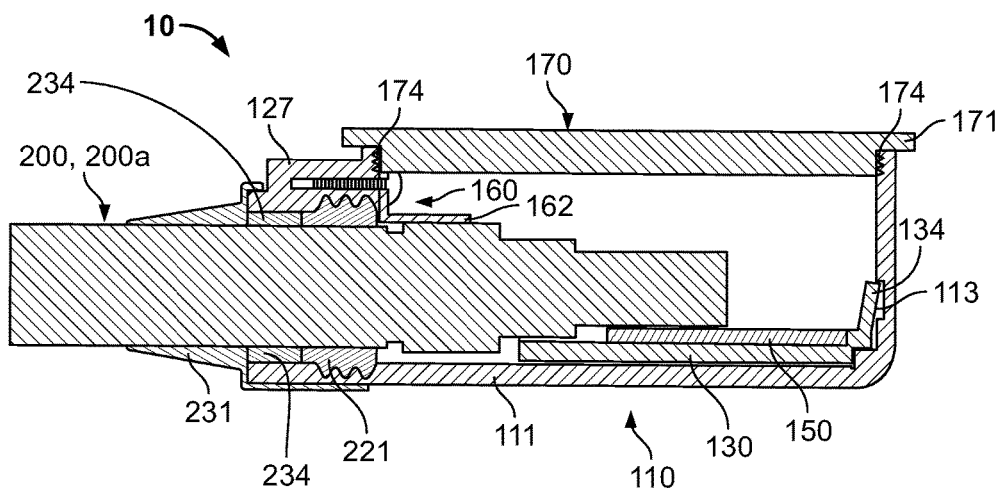
FIG. 5 is a cross sectional view of the linked cable assembly.

FIG. 1 only shows one of the pair of inner notches 113. The other pair (not shown) is obstructed by side walls 118. As shown in FIGS. 2 and 5, inner notches 113 accommodate tabs 134 of insulator 130 to retain insulator 130.

Ports 125 are cylindrical and include opposed locking tabs 126 and a fastener burrow 127. Locking tabs 126 are configured to project into corresponding locking recesses of cable assemblies 200. Ports 125, in conjunction with end walls 119 define cylindrical wire holes 128, and cylindrical fastener channels 129.

Insulator 130 is configured to snugly fit between the pair of first raised shelves 114 and the pair of second raised shelves 116. Insulator 130 may be a polymer and/or dielectric. Insulator 130 defines a bus bar groove 131 and includes a pair of shelves 132, bus bar tabs 133, and shield connector tabs 134. Bus bar tabs 133 and shield connector tabs 134 project from shelves 132. Bus bar tabs 133 partially protrude over bus bar groove 131 to retain bus bar 150. Shield connector tabs 134 extend into inner notches 113 to oppose vertical motion of insulator 130 with respect to shield connector 110. The depicted embodiment includes four bus bar tabs 113 and four shield connector tabs 134.

As shown in FIGS. 2 and 5, insulator 130 sits on the pair of lower raised shelves 115 (only one is shown, the other is unshown and obscured by side walls 118). As such, a bottom of insulator 130 is spaced above a top of bottom wall 117 of shield connector body 111. This spacing advantageously increases the distance between bus bar 150 and shield connector 110. Opposing ends of insulator 130 fit against the pair of first raised shelves 114 and the pair of second raised shelves 116. FIG. 2 only shows one of the pair of second raised shelves 116 (the other is obstructed by one of the side walls 118). To further isolate bus bar 150 from shield connector 110, and as shown in FIG. 5, shelves 132 of insulator 130 are spaced from side walls 118 such that shelves 132 do not contact side walls 118.

Bus bar 150 is fabricated from an electrically conductive metal (e.g., copper). Bus bar 150 lies flush within bus bar groove 131. Bus bar 150 is be sized such that a top surface of bus bar 150 is flush with shelves 132 of insulator 130. FIG. 2 shows inner cores 202 of cable assemblies 200 resting on bus bar 150. In practice, and as described with reference to FIG. 6, inner cores 202 may be bonded to bus bar 150.

Each spring clamp assembly 160 comprises a fastener 161 and a spring clamp 162. Spring clamp 162 comprises an arced clamp body 163 and a spring hinge 164. Spring hinge 164 is "L" shaped and defines a fastener hole (not labeled). Fastener 161 extends through the fastener hole of spring hinge 164 and to occupy fastener channel 129. Arced clamp body 163 has a radius of curvature matching a shield crimp ring 211 of cable assembly 200. Upon installation of cable assembly 200, arced clamp body 163 compressively bears on shield crimp ring 211. Thus, prior to installation of cable assembly 200, arced clamp body 163 occupies a first position and after installation of cable assembly 200, arced clamp body 164 occupies a second position. The first position is closer to bottom wall 117 of shield connector body 111 than the second position. As such, upon installation of cable assembly 200, spring hinge 164 biases arced clamp body 164 toward bottom wall 117 of shield connector body, thus generating the compressive force against cable assembly 200.

Spring clamps 162 are fabricated from an electrically conductive material (e.g., copper) to enable electrical communication between shield crimp ring 211 and shield connector body 111 therethrough. By virtue of the downward compressive force of spring clamps 162, shield crimp ring 211 bears against shield connector body bottom wall 117 and/or raised shelves 114 or 116 to further enable electrical communication between shield crimp ring 211 and shield connector body 111.

Figure 3:
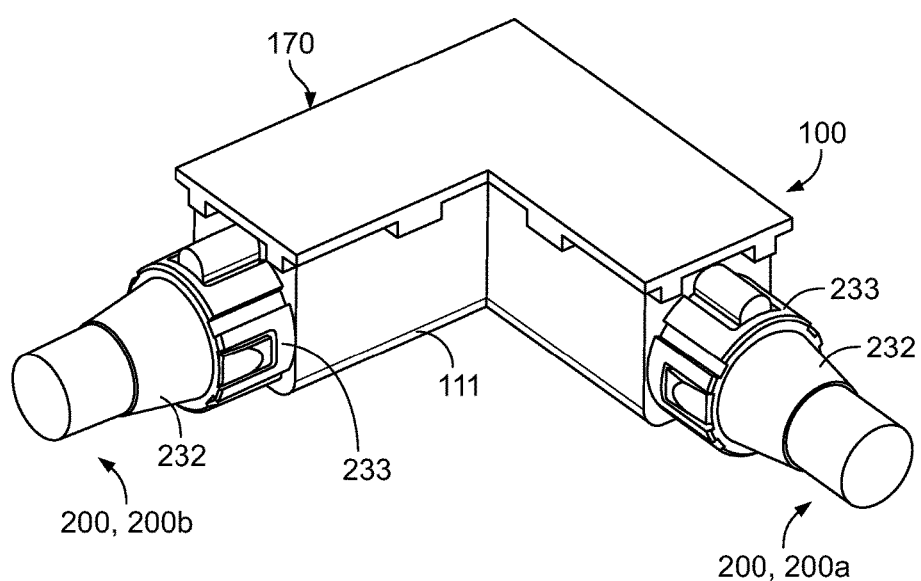
FIG. 3 is an isometric view of the linked cable assembly.
Figure 4:
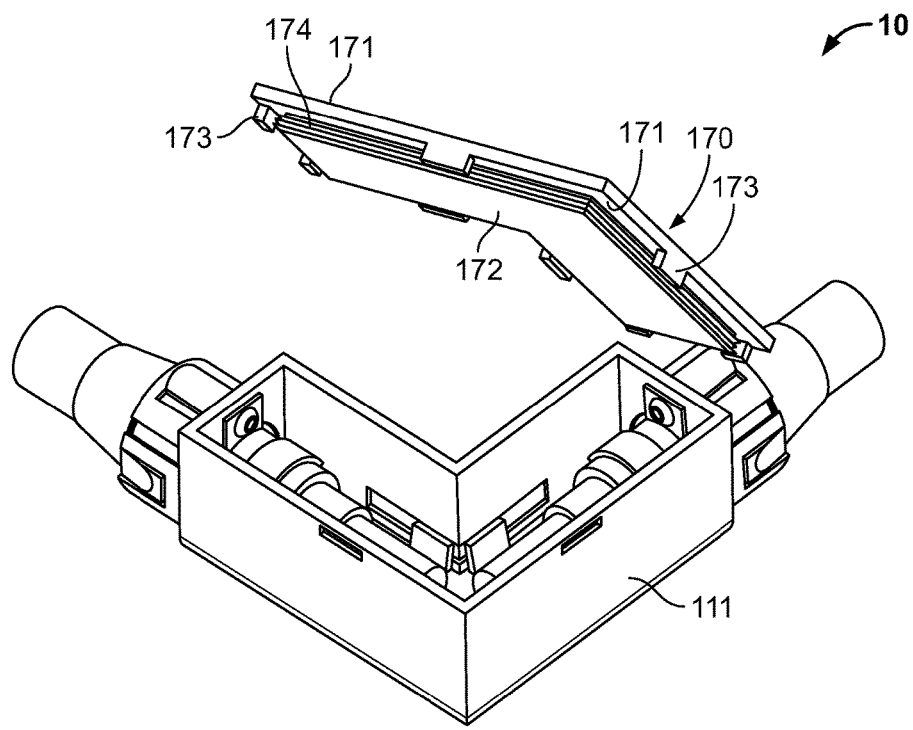
FIG. 4 is an isometric view of the linked cable assembly with a cover of the linked cable assembly shown as floating.

With reference to FIGS. 3 and 4, cover 170 includes a base 171, a projection 172 extending from base 171, and locking tabs 173. Peripheral sides of projection 172 are ridged 174 to generate a tight fit between projection 172 and shield connector body 111. Locking tabs 173 engage outer notches 120. Projection 172 is electrically conductive (e.g., copper) and in electrical communication with connector body 111 via ridges 174, which bear on connector body 111. Base 171 may be electrically conductive (e.g., copper) or insulative (e.g., plastic, polymeric).

Each cable assembly 200 includes a stripped cable end 201, a shield crimp ring 211, an annular seal 221, and a cap 231. Stripped cable end 201 reveals an inner core 202 (fabricated from electrically conductive material such as copper), an inner dielectric insulator 203 (e.g., a dielectric plastic or polymer), a shield 204 (fabricated from electrically conductive material such as copper), and a sheath 205 (e.g., a thick dielectric plastic or polymer). With reference to FIG. 1, stripped cable end 201 is configured such that inner core 202 projects further (along the longitudinal axis of cable assembly 200) than inner insulator 203, which projects further than shield 204, which projects further than sheath 205.

Figure 7:
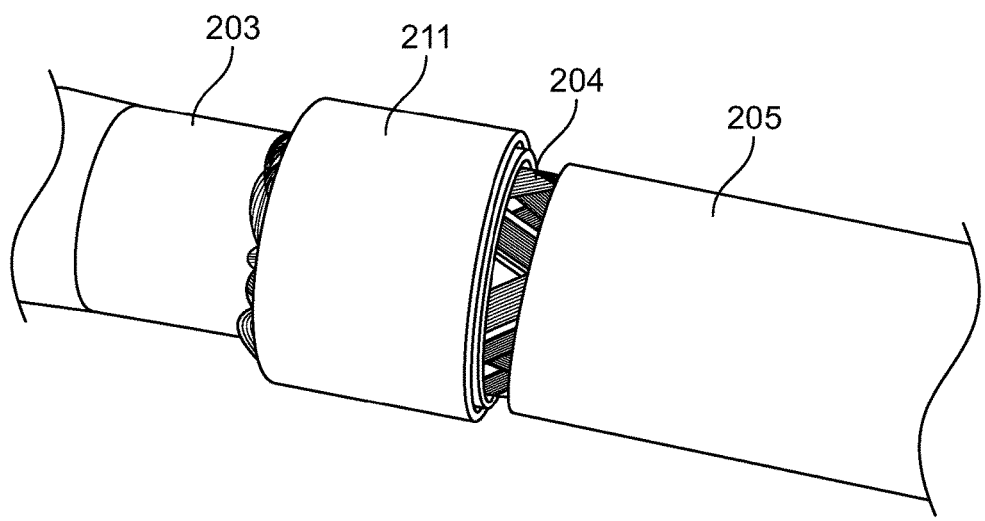
FIG. 7 shows a shield and a crimp ring.

With reference to FIG. 7, shield 204 is made of woven metal (e.g., copper). Upon stripping, crimp ring 211 is positioned around the exposed portion of shield 204 and inwardly crimped to electrically join shield 204 with crimp ring 211. Other suitable joining methods (e.g., soldering) may be applied. Although FIG. 7 shows exposed shielding 204, crimp ring 211, upon assembly, may substantially circumferentially cover all exposed shielding 204.

Figure 6:
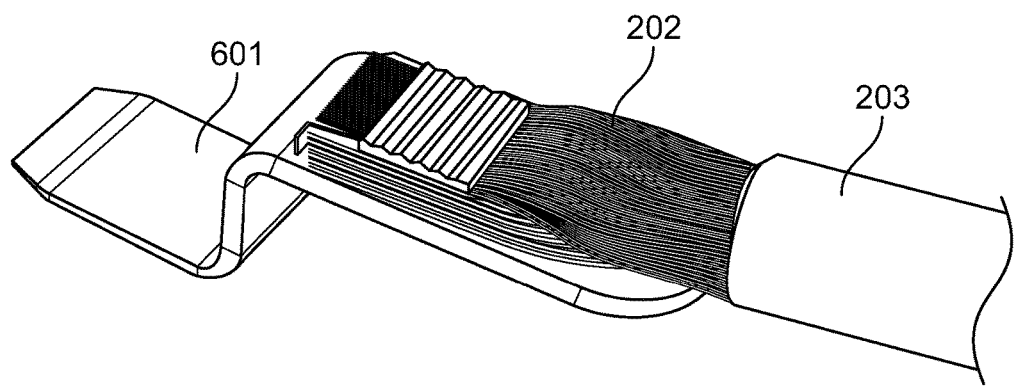
FIG. 6 shows an inner core bonded with a generic substrate.

FIG. 6 shows a known method of bonding an inner core 202 with a generic substrate 601. Inner core 202 is defined by thin wire strands. Upon stripping, these thin wire strands are exposed. During assembly, the exposed thin wire strands are placed on generic substrate 601 and melted thereto. The same method may be applied to bond inner core 202 with bus bar 150.

Annular seal 221 and cap 231 are insulators (e.g., polymeric, plastic, etc.). Referring to FIGS. 1 and 5, annular seal 221 is disposed about stripped cable end sheath 205. As shown in FIG. 5, annular seal 221 includes a plurality of annular ridges. When cable assembly 200 is inserted into port 125, the annular ridges compressively seal against port 125. By virtue of bearing against the annular ridges, port 125 causes at least a portion of the inner diameter of annular seal 221 to shrink and thus compressively seal against sheath 205. As a result: (a) both of annular seal 221 and sheath 205 are retained in position within port 125, (b) annular seal 221 forms a plurality of outer annular seals against port 125, and (c) annular seal 221 forms a plurality of inner annular seals against sheath 205.

With reference to FIGS. 1 to 3, cap 231 includes a base 232 and longitudinally projecting tabs 233. Two opposed longitudinally projecting first tabs 233 define closed apertures (i.e., having closed perimeters) for receiving locking tabs 126. Two adjacent longitudinally projecting second tabs 233 define a slot for receiving fastener burrow 127. Cap 231 may include a cylindrical retaining ring 234 (see FIG. 5) disposed radially inward of projecting tabs 233. Cylindrical retaining ring 234 encompasses sheath 205. As a user slides cap 231 along sheath 205, cylindrical retaining ring 234 pushes annular seal 221 toward shield connector 110. Cylindrical retaining ring 234 pushes annular seal 221 toward a terminal position, shown in FIG. 5, where a forward end of annular seal 221 contacts spring clamp 162. According to some embodiments, base 232 is inverted (i.e., extends in the opposite direction) such that projecting tabs 233 obscure base 232. According to these embodiments, base 232 may serve as the cylindrical retaining ring.

Any and all components that are electrically conductive may be metallic (e.g., copper). Any and all components that are insulative may be polymeric and/or plastic. According to some embodiments, inner insulator 203 of cable assembly 200 and insulator 130, one or both of which may be dielectric, are made of a different material than the other insulative components.

We claim:
1. A linked cable assembly comprising:
  a pair of shielded cables having inner cores and inner shields;
  a connector assembly electrically linking the shielded cables and comprising:
    a conductive shield housing;
    an insulator disposed within the shield housing;
    a conductive busbar contacting the insulator, but not the shield housing
    a pair of rings crimped to the inner shields and contacting the shield housing; and,
    a pair of spring clamps fastened to the shield housing;
  wherein the inner shields are electrically linked via the conductive shield housing, and the inner cores are electrically linked via the busbar.
2. The assembly of claim 1, wherein the pair of spring clamps bias the pair of rings against the shield housing.
3. The assembly of claim 2, wherein the shield housing comprises a floor and sidewalls, both defining a chamber in which the insulator and busbar are disposed.
4. The assembly of claim 3, wherein the shield housing comprises a pair of opposed shelves on which the insulator rests.
5. The assembly of claim 4, wherein the shelves space the insulator from the floor.
6. The assembly of claim 5, wherein the insulator includes tabs projecting into grooves defined in the sidewalls.
7. A cable assembly comprising:
  a stripped cable comprising:
    an inner conductive core,
    an inner insulator surrounding the core,
    an inner shield surrounding the inner insulator,
    a sheath surrounding the inner shield;
  an electrically conductive ring crimped and compressed directly against the inner shield; and,
  an annular seal disposed about the sheath, the annular seal comprising an outward annular ridge.
8. The assembly of claim 7, further comprising an annular cap secured to the sheath, the annular cap comprising an annular base and a plurality of tabs extending from the base, the plurality of tabs defining a pair of closed apertures and an open slot.
9. The assembly of claim 8, wherein the annular cap and the annular seal are configured to slide along the sheath.
10. A linked cable assembly comprising:
  the stripped shielded cable assembly of claim 9;
  a connector assembly comprising a fastener burrow, the fastener burrow extending through the open slot.
11. A linked cable assembly comprising:
  the stripped shielded cable assembly of claim 9;
  a connector assembly comprising a cylindrical port defining a cylindrical port opening, the stripped cable extending through the cylindrical port, the annular seal being compressed between the cylindrical port and the sheath.
12. A linked cable assembly comprising:
  a pair of stripped shielded cable assemblies, each comprising:
    a stripped cable comprising:
      an inner conductive core,
      an inner insulator surrounding the core,
      an inner shield surrounding the inner insulator,
      a sheath surrounding the inner shield,
    an electrically conductive ring crimped and compressed directly against the inner shield;
    wherein an annular seal is disposed about the sheath, the annular seal comprising an outward annular ridge;
  a connector assembly electrically linking the shielded cables and comprising:
    a conductive shield housing,
    an insulator disposed within the shield housing,
    a conductive busbar contacting the insulator, but not the shield housing.

* * * * *